United States Patent
Song et al.

(10) Patent No.: US 12,126,018 B2
(45) Date of Patent: Oct. 22, 2024

(54) POSITIVE ELECTRODE ACTIVE MATERIAL FOR RECHARGEABLE LITHIUM BATTERY, PRODUCTION METHOD THEREFOR AND RECHARGEABLE LITHIUM BATTERY COMPRISING SAME

(71) Applicant: RESEARCH INSTITUTE OF INDUSTRIAL SCIENCE & TECHNOLOGY, Pohang-si (KR)

(72) Inventors: Jung Hoon Song, Seoul (KR); Sang Cheol Nam, Seoul (KR); Kwon Young Choi, Seoul (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 699 days.

(21) Appl. No.: 17/296,284

(22) PCT Filed: Nov. 25, 2019

(86) PCT No.: PCT/KR2019/016281
§ 371 (c)(1),
(2) Date: May 24, 2021

(87) PCT Pub. No.: WO2020/106126
PCT Pub. Date: May 28, 2020

(65) Prior Publication Data
US 2022/0029157 A1    Jan. 27, 2022

(30) Foreign Application Priority Data
Nov. 23, 2018   (KR) ........................ 10-2018-0146790

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ................ H01M 4/505; H01M 4/525; H01M 2004/021; H01M 2004/028; C01P 2004/51; C01P 2004/61; C01G 53/50
See application file for complete search history.

(56) References Cited

U.S. PATENT DOCUMENTS

| 2004/0253516 A1 | 12/2004 | Yuasa et al. |
| 2009/0173632 A1 | 7/2009 | Nagayama et al. |

(Continued)

FOREIGN PATENT DOCUMENTS

| CN | 104380502 | 2/2015 |
| CN | 106920934 | 7/2017 |

(Continued)

OTHER PUBLICATIONS

Jae-Hyun Shim et al., "Effects of heat-treatment atmosphere on electrochemicalperformances of Ni-rich mixed-metal oxide (LiNi0.80Co0.15Mn0.05O2) as a cathode material for lithium ion battery", Electrochimica Acta. Issue 138, p. 15-21 (Jun. 19, 2014).

(Continued)

*Primary Examiner* — Brittany L Raymond
(74) *Attorney, Agent, or Firm* — LEX IP MEISTER, PLLC (57) ABSTRACT

The present invention provides a cathode active material for a lithium secondary battery comprising secondary particles in which primary particles represented by Chemical Formula 1 below are aggregated, wherein the average particle size (D50) of the secondary particles is 2.5 μm or more and 7 μm or less, and the average value of the sphericity coefficient, (Continued)

which is the ratio (l/w) of the long axis length (l) to the short axis length (w) of the secondary particles, is 1.0 to 1.25.

18 Claims, 3 Drawing Sheets

(51) Int. Cl.
  *H01M 4/02* (2006.01)
  *H01M 4/505* (2010.01)
  *H01M 10/0525* (2010.01)
(52) U.S. Cl.
  CPC ..... *H01M 10/0525* (2013.01); *C01P 2004/51* (2013.01); *H01M 2004/021* (2013.01); *H01M 2004/028* (2013.01)

(56) References Cited

U.S. PATENT DOCUMENTS

| | | | |
|---|---|---|---|
| 2012/0115028 A1 | 5/2012 | Ueno et al. | |
| 2014/0227594 A1 | 8/2014 | Song et al. | |
| 2016/0211517 A1† | 7/2016 | Beck | |
| 2018/0316006 A1* | 11/2018 | Kaneda | C01G 53/00 |
| 2018/0316606 A1† | 11/2018 | Kaneda | |

FOREIGN PATENT DOCUMENTS

| | | |
|---|---|---|
| CN | 107331858 | 11/2017 |
| CN | 108025925 | 5/2018 |
| CN | 108580143 | 9/2018 |
| DE | 102015210791 | 6/2016 |
| DE | 102016224252 | 6/2018 |
| JP | 2011-124028 | 6/2011 |
| JP | 2017-065975 | 4/2017 |
| JP | 2017-117529 | 6/2017 |
| JP | 6142929 | 6/2017 |
| JP | 6200932 | 9/2017 |
| JP | 2017-195205 | 10/2017 |
| JP | 6206227 | 10/2017 |
| KR | 10-2004-0106207 | 12/2004 |
| KR | 10-2009-0082790 | 7/2009 |
| KR | 10-2011-0063360 | 6/2011 |
| KR | 10-2014-0002503 | 1/2014 |
| KR | 10-1375704 | 3/2014 |
| KR | 10-1440241 | 9/2014 |
| KR | 10-2015-0050427 | 5/2015 |
| KR | 10-1605969 | 3/2016 |
| KR | 10-2017-0076164 | 7/2017 |
| KR | 10-2018-0059753 | 6/2018 |
| KR | 10-1883406 | 7/2018 |
| KR | 10-2019-0075729 | 7/2019 |
| WO | 2019-131779 | 12/2019 |

OTHER PUBLICATIONS

KIPO, PCT Search Report & Written Opinion of PCT/KR2019/016281 dated May 6, 2020.
SIPO, Office Action of CN 201980076887.3 dated Jul. 19, 2023.
DPMA, Office Action of DE 112019005846.0 dated May 28, 2024.

\* cited by examiner
† cited by third party

POSITIVE ELECTRODE ACTIVE MATERIAL FOR RECHARGEABLE LITHIUM BATTERY, PRODUCTION METHOD THEREFOR AND RECHARGEABLE LITHIUM BATTERY COMPRISING SAME

CROSS-REFERENCE TO RELATED APPLICATION

This application claims priority to and the benefit of Korean Patent Application No. 10-2018-0146790 filed in the Korean Intellectual Property Office on Nov. 23, 2018, the entire contents of which are incorporated herein by reference.

BACKGROUND OF THE INVENTION

(a) Field of the Invention

The present invention relates to a cathode active material for a lithium secondary battery, a method for manufacturing the same, and a lithium secondary battery comprising the cathode active material.

(b) Description of the Related Art

A cathode active material, which is one of constituent elements of a lithium secondary battery, not only directly contributes to expressing the energy density of the battery, but also serves as a factor that determines cycle-life characteristics and the like. In this regard, studies on a ternary cathode active material based on nickel-cobalt-manganese has been actively performed in recent years, and the production of a cathode precursor using a co-precipitation method is mainly used. To prepare a ternary cathode precursor using the co-precipitation method, nickel sulfate, cobalt sulfate, and manganese cobalt having a concentration of 1 to 3M are injected into the reactor, while the co-precipitation method using an ammonia solution as a complexing agent and caustic soda as a precipitating agent is applied.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a cathode active material for a lithium secondary battery and a method for manufacturing the same, and a lithium secondary battery comprising the cathode active material having advantages of improving the tap density of the precursor and capacity characteristics by manufacturing a cathode precursor with a small average particle size and improved sphericity. An exemplary embodiment of the present invention provides a cathode active material for a lithium secondary battery and a method for manufacturing the same, and a lithium secondary battery comprising the cathode active material. Another embodiment of the present invention provides,
Yet another embodiment of the present invention provides
According to an embodiment of the present invention,

Technical Problem

A typical manufacturing method for preparing a small-diameter metal hydroxide precursor for a secondary battery using a continuous reactor, that is, a ternary metal hydroxide precursor having a size of 2.5 or more and 7 μm or less, is performed with nickel, manganese, and cobalt having a concentration of 1 to 3M at a temperature of 45° C. or more, and the prepared metal ions are added, and ammonia consisting of 0.5 to 1.5 times the number of moles of metal ions is added, while adjusting the pH to 11 to 12 using NaOH. In a general manufacturing method for preparing a small particle size precursor, the typical method is operated so that the residence time has an operation range of 16 hours or less, and the size of the precursor produced thereby is generally known to be 6-7 μm in size.

When applying a general continuous method for manufacturing a small particle size precursor, it is known as a very important technique to suppress the rapid growth of particles. In the case of manufacturing the precursor by a general method, the growth of the precursor occurs in the initial 30 minutes to 1 hour after the metal ions are introduced, and the particles rapidly grow to 5 μm or more. The cause of this rapid growth is mainly caused by a physical phenomenon called Ostwald ripening, which occurs mainly in particles such as colloids, and excessive surface cohesion. This rapid growth causes pores inside the precursor to greatly deteriorate the characteristics of the product, and the shape of the particle is made to lose its value as a product because it makes the shape of the particle greatly deviated from the spherical shape like a peanut shape. Therefore, in order to suppress the occurrence of such a problem when manufacturing a small particle size precursor, conventionally, excessive nucleation is induced, and a long batch time of 15 hours or more has been adopted. That is, it causes excessive nucleation in the initial stage and forms a large amount of seeds so that very small fine particles are generated, and a method for preventing pores from becoming large due to the agglomeration of fine particles has been adopted for the internal pores generated during the Ostwald ripening or surface agglomeration that occurs afterwards. In addition, a method for increasing the sphericity by increasing the frictional force between particles by introducing a batch time of 15 hours or more is used.

The conventional manufacturing method for a small particle size precursor is a method for inducing the generation of many nuclei and improving the sphericity by performing a process operation for a long time after agglomeration, and there is a problem in that it is operated under a high pH condition or an excessive amount of caustic soda is used compared to ammonia. However, it is impossible to obtain a powder with good sphericity because the mechanism of particle growth induces forcible agglomeration. In addition, since a batch time of 10 hours or more is required, the process cost also increases.

In order to improve such a conventional problem, the present invention proposes a co-precipitation method in which crystals are easily produced in the beginning, but agglomeration is minimized. The co-precipitation method has a characteristic of maximizing a self-assembly phenomenon, such as giving conditions for generating or growing a precursor by itself. This method is operated at a low temperature and can significantly reduce the process cost because it can shorten the process time by more than ⅓ compared to the existing method. In addition, since the prepared precursor grows in the crystal growth direction, the cathode active material prepared from the precursor has orientation and sphericity is greatly improved. Further, it is possible to manufacture the tap density of the cathode precursor to 1.7 g/cm 3 or more.

Technical Solution

An exemplary embodiment of the present invention provides a cathode active material for a lithium secondary battery comprising secondary particles in which primary particles represented by Chemical Formula 1 below are aggregated, wherein the average particle size (D50) of the secondary particles is 2.5 µm or more and 7 µm or less, and the average value of the sphericity coefficient, which is the ratio (1/w) of the long axis length (I) to the short axis length (w) of the secondary particles, is 1.0 to 1.25:

$Li_aNi_xCo_yMn_{(1-x-y)}O_2$ [Chemical Formula 1]

in the Chemical Formula 1, 0.80≤a≤1.20, 0.33≤x≤0.90, 0≤y≤0.33, and 0<x+y<1.

The primary particles positioned on the surface of the secondary particles may have a rod shape.

The average particle size (D50) of the secondary particles may be 2.5 to 6 µm.

The secondary particles may have a ratio of the D10 particle size to the D50 particle size (D10/D50) of 0.64 to 0.91.

The secondary particles may have a ratio of the D10 particle size to the D25 particle size (D10/D25) of 1.07 to 0.75.

The secondary particles may have a ratio of the D90 particle size to the D50 particle size (D90/D50) of 1.65 to 1.16.

The secondary particles may have a ratio of the D90 particle size to the D75 particle size (D90/D75) of 1.41 to 0.98.

The secondary particles may have a ratio of "D90-D10 particle size difference" to D50 particle size (D90-D10/D50) of 0.25 to 1.01.

The cathode active material may be originated from the precursor with a tap density of 1.7 to 2.2 g/cm3 at 25° C.

When rolling with a pressure of 20 kN at 25° C., the density of the cathode active material may be 2.5 to 3.5 g/cm³.

The aspect ratio of the primary particles located on the surface of the secondary particles may be 0.45 or less.

In XRD measurement, the value of the cathode active material may be 2.8705 to 2.8750, for example, 2.8735 to 2.8750.

The impedance resistance of the cathode active material may be 5.0 (ohm) or less.

When analyzing EBSD (Electron backscatter diffraction) below 30 degrees of orientation difference (Δg), the orientation of the cathode active material in the [120]+[210] direction based on the RD axis may be 85% or more.

When analyzing EBSD below 30 degrees of orientation difference (Δg), the orientation of the cathode active material in the [120]+[210] direction based on the ND axis may be 70% or more.

Another exemplary embodiment of the present invention provides a method for manufacturing a cathode active material by, and obtaining a cathode active material for a lithium secondary battery by mixing and calcining the precursor and the lithium raw material, wherein the co-precipitation reaction induces a co-precipitation reaction by stirring an aqueous metal salt solution including a nickel salt, a manganese salt, and a cobalt salt, ammonia, and caustic soda in a reactor, and in the co-precipitation reaction, the temperature in the reactor is 25 to 35° C.

In the co-precipitation reaction, the stirring speed of the aqueous metal salt solution, ammonia, and caustic soda in the reactor may be 2 m/sec to 11 ms/sec at a linear speed.

In the co-precipitation reaction, the stirring speed of the aqueous metal salt solution, ammonia, and caustic soda in the reactor may be 50 to 200 rpm at a rotational speed.

In the co-precipitation reaction, the residence time in the reactor of the aqueous metal salt solution may be 10 hours or less.

In the co-precipitation reaction, the residence time in the reactor of the aqueous metal salt solution is 30 minutes to 4 hours.

In the co-precipitation reaction, the ratio of the total number of moles of metal ions in the aqueous metal salt solution to be continuously injected and the number of moles of ammonia injected quantitatively [the total number of moles of metal ions in the aqueous solution of metal salt continuously injected: the number of moles of ammonia to be quantitatively injected] is 1:0.5 to 1:1.5.

In the co-precipitation reaction, the pH in the reactor may be maintained in the range of 10.5 to 12.0.

Another exemplary embodiment of the present invention provides a cathode electrode containing the cathode active material according to any one of claim 1 to claim 15.

Advantageous Effects

A cathode active material for a lithium secondary battery with a small average particle size (small particle size) and improved sphericity may be provided.

A lithium secondary battery with improved tap density of the cathode precursor and improved electrode density and capacity characteristics may be provided.

A lithium secondary battery with improved electrochemical properties by the cathode active material of improved orientation may be provided.

DETAILED DESCRIPTION OF THE EMBODIMENTS

Figure 1:
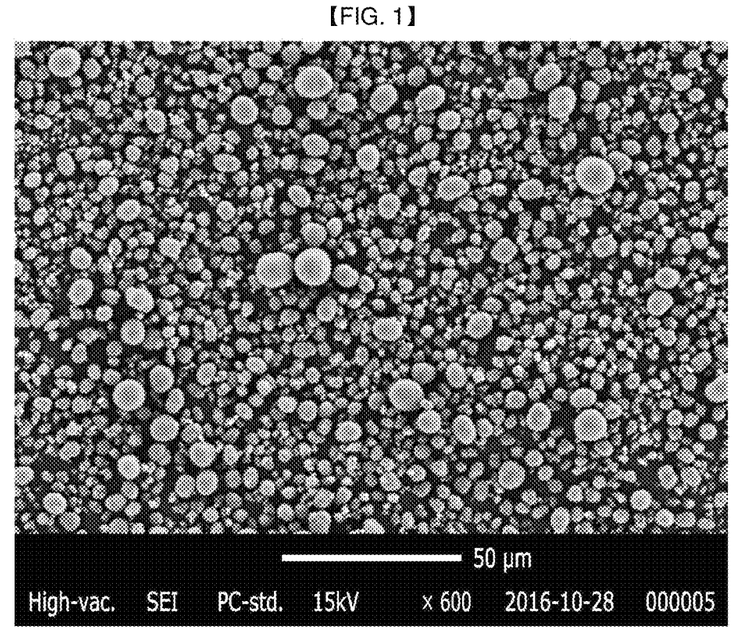
FIG. 1 shows a SEM image of the precursor prepared in Example 2.
Figure 2:
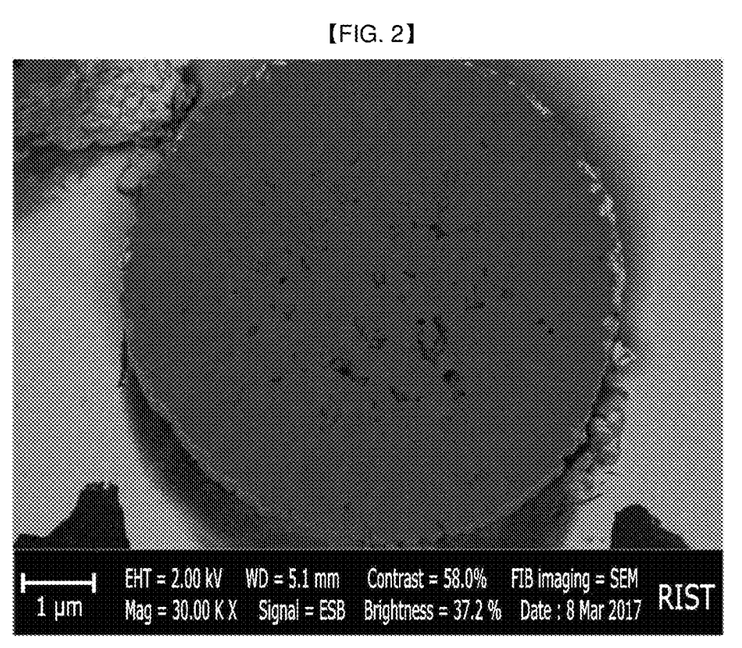
FIG. 2 shows a cross-sectional SEM image of the secondary particles of the precursor prepared in Example 2.
Figure 3:
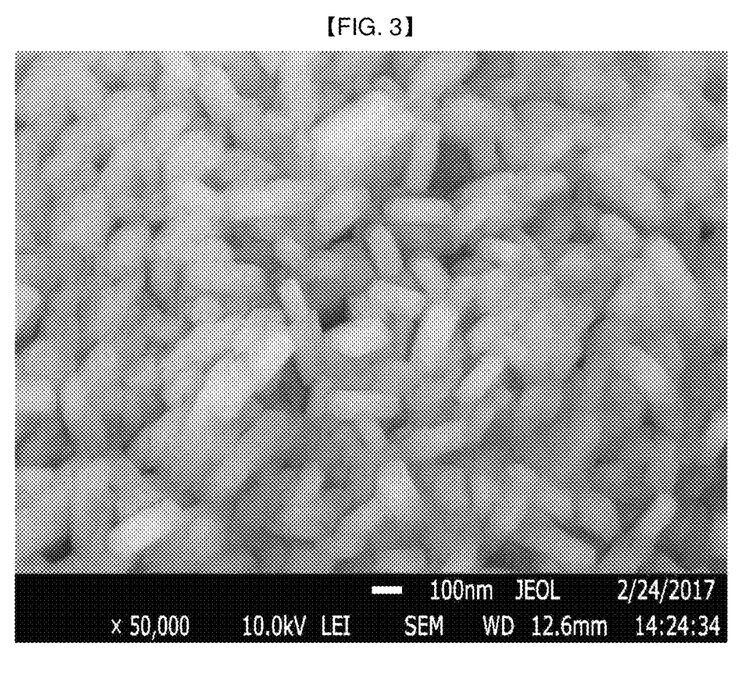
FIG. 3 shows a SEM image of the primary particles of the precursor prepared in Example 2.

Hereinafter, Embodiments of the present invention will be described in detail. However, this is presented as an example, whereby the present invention is not limited, and the present invention is only defined by the scope of the claims to be described later.

A typical manufacturing method for preparing a small-diameter metal hydroxide precursor for a secondary battery using a continuous reactor, that is, a ternary metal hydroxide precursor having a size of 2.5 or more and 7 µm or less, is performed with nickel, manganese, and cobalt having a concentration of 1 to 3M at a temperature of 45° C. or more, and the prepared metal ions are added, and ammonia consisting of 0.5 to 1.5 times the number of moles of metal ions is added, while adjusting the pH to 11 to 12 using NaOH. In a general manufacturing method for preparing a small particle size precursor, the typical method is operated so that the residence time has an operation range of 16 hours or less, and the size of the precursor produced thereby is generally known to be 6-7 μm in size.

This method for manufacturing a small particle size precursor is based on a method for establishing operating conditions while improving the problems caused by rapid growth, which usually occurs at 5 μm or less when the precursor size is small. In general, when the precursor particles are less than several μm, Ostwald ripening, which is a characteristic of self-growing, or agglomeration, which tends to agglomerate among precursors occurs largely. Due to this phenomenon, when preparing a general ternary precursor, particles have a characteristic of growing as large as 5 μm or more in the initial 30 minutes to 1 hour. This characteristic adversely affects the production of a ternary precursor, which is a cathode material for a secondary battery. That is, due to sudden growth, pores inside the final precursor secondary particles are largely developed, or particles with poor sphericity coefficient showing a crushed shape such as a peanut may be produced. In general, the purpose of manufacturing a small particle size electrode material is a method to increase the electrode density by sandwiching between large particle size electrode materials, and if the sphericity coefficient of the small particle size is not good, it is difficult to increase the electrode density, so the value as a product is lost.

In order to overcome this problem, in the existing process, the sphericity coefficient of the small particle size precursor is improved by increasing the process time or increasing the stirring speed. Increasing the residence time induces friction between small particle size precursors, thereby improving sphericity coefficient. In addition, since the increase of the stirring speed induces friction between the small particle size precursors, the sphericity coefficient is improved. However, when the residence time becomes longer, the characteristics of particle growth rather than friction appear, making it very difficult to manufacture a small particle size precursor, and if the stirring is increased, the surface of the generated precursor is worn due to friction, and this leads to a problem of deteriorating performance during manufacturing.

Therefore, manufacturing a small particle size precursor generally requires a much higher technical level compared to a process of manufacturing a large particle size precursor. This cause is due to the characteristics of the phenomenon that naturally appears on the colloidal surface of the aforementioned Ostwald ripening and agglomeration.

The basic idea of the present invention is characterized in that a small particle size precursor is manufactured by using a physical phenomenon caused by the existing Ostwald ripening and minimizing the physical phenomenon caused by aggregation. That is, by lowering the reaction temperature of 45° C. or higher, which is a commonly used precursor preparation temperature, to 35° C. or less, specifically 25° C. to 35° C., it is characterized in that the characteristic of agglomeration hardly occurs. In addition, by increasing the ionic strength in the reactor when the particles are generated, seed particles close to a spherical shape are generated. In other words, the present idea is characterized by producing a spherical small particle size precursor having a high tap density, and by increasing the ionic strength in the reactor, spherical seed particles are generated inside, and the temperature is reduced to suppress agglomeration of particles and promote crystal growth. The small particle size precursor manufactured in the present invention has a high tap density, and orientation may be improved.

The cathode active material according to an embodiment may comprise secondary particles in which primary particles represented by Chemical Formula 1 below are aggregated, wherein the average particle size (D50) of the secondary particles is 2.5 μm or more and 7 μm or less, and the average value of the sphericity coefficient, which is the ratio (1/w) of the long axis length (1) to the short axis length (w) of the secondary particles, is 1.0 to 1.25:

$Li_aNi_xCo_yMn_{(1-x-y)}O_2$ [Chemical Formula 1]

in the Chemical Formula 1, $0.80 \leq a \leq 1.20$, $0.33 \leq x \leq 0.90$, $0 \leq y \leq 0.33$, and $0 < x+y < 1$.

The average particle size (D50) of the secondary particles may be 2.5 to 6 μm, for example, 2.5 to 5.5 μm, 3.0 to 5.5 μm, or 3.0 to 4.5 μm. Further, the secondary particles may have a ratio of the D10 particle size to the D50 particle size (D10/D50) of 0.64 to 0.91. Further, the secondary particles may have a ratio of the D10 particle size to the D25 particle size (D10/D25) of 1.07 to 0.75. Further, the secondary particles may have a ratio of the D90 particle size to the D50 particle size (D90/D50) of 1.65 to 1.16. Further, the ratio of the D90 particle size to the D75 particle size (D90/D75) may be 1.41 to 0.98. Further, the ratio of "D90-D10 particle size difference" to D50 particle size (D90-D10/D50) may be 0.25 to 1.01.

When the average particle size (D50) of the secondary particles of the cathode active material falls within the above range, the tap density of the cathode precursor is improved, and further, a lithium secondary battery with improved electrode density and capacity characteristics may be obtained. Further, when each of the ratio of the D10 particle size to the D50 particle size, the ratio of the D10 particle size to the D25 particle size, the ratio of the D90 particle size to the D50 particle size, the ratio of the D90 particle size to the D75 particle size, and the ratio of "D90-D10 particle size difference" to D50 particle size of the secondary particle fall within the above range, the secondary particles may have a uniform particle size, and accordingly, the tap density, the electrode density, and the battery capacity characteristics of the cathode precursor may be improved.

Meanwhile, the ratio "D90–D10"/D50 (SPAN) value calculated as described above is a numerical value indicating the degree of particle size distribution, and a smaller value means that the particle has a more uniform and narrow particle size distribution.

Meanwhile, the average particle size (D50) of the secondary particles of the cathode active material is the transfer of the secondary particles of the cathode precursor and has an average particle size (D50) substantially equal to that of the precursor particles.

The average value of the sphericity coefficient, which is the ratio (1/w) of the long axis length (1) to the short axis length (w) of the secondary particles, may be 1.0 to 1.25, for example, 1.0 to 1.20, 1.0 to 1.17, 1.0 to 1.15 or 1.0 to 1.1.

When the sphericity coefficient of the secondary particles fall within the above range, the tap density of the cathode precursor is improved, and further, a lithium secondary battery with improved electrode density and capacity characteristics may be obtained.

Meanwhile, as the sphericity has a value closer to 1, it means that the secondary particles are closer to the spherical shape.

The primary particles positioned on the surface of the secondary particles may have a rod shape. The aspect ratio of the primary particles located on the surface of the secondary particles may be 0.45 or less. More specifically, the aspect ratio of the primary particles may be in the range of 0.21 to 0.45, 0.25 to 0.41, or 0.35 to 0.41. Accordingly, the primary particles of the cathode active material may have a rod shape, and the impedance resistance of the cathode active material may be improved. When the aspect ratio is 0.45 or less, the impedance value may be lowered to 3.8 or less, thereby remarkably improving the resistance characteristics of the lithium secondary battery.

On the other hand, the aspect ratio of the primary particles represents the ratio of the short axis length to the major axis length for the quadrangle primary particles and may have a numerical range of 0 to 1. The closer the aspect ratio of the primary particle is to 1, the closer it is to a spherical shape (or square shape), and closer to 0 means that it is closer to a rod (rectangular shape) shape.

In XRD (X-ray diffractometer) measurement, the a value of the cathode active material may be in the range of 2.8705 to 2.8750, more specifically, 2.8735 to 2.8750.

As the a value discloses a larger value compared to the conventional one, the crystallinity of the secondary particles is improved, and a lithium secondary battery in which the tap density, electrode density, and capacity characteristics of the cathode precursor are improved may be provided.

The cathode precursor may have a tap density of 1.7 to 2.2 g/cm3, for example, 2.0 to 2.2 g/cm3 or 2.1 to 2.2 g/cm3 at 25° C.

When rolling with a pressure of 20 kN at 5° C., the pellet density may be 2.5 to 3.5 g/cm3, for example, 2.6 to 3.5 g/cm3 or 3.0 to 3.4 g/cm3.

The impedance resistance of the cathode active material may be 5.0 (ohm) or less, for example, 4.0 (ohm) or less, or 3.8 (ohm) or less. Accordingly, a lithium secondary battery with improved performance may be obtained.

When analyzing EBSD (Electron backscatter diffraction) below 30 degrees of orientation difference (Δg), the orientation of the cathode active material in the [120]+[210] direction based on the RD axis may be 85% or more, for example, 85 to 90% or 85 to 88%. When analyzing EBSD, the high orientation in the direction of the RD axis [120]+[210] means that the lithium migration path is well distributed to the outer shell. Since the crystal structure of the hydroxide precursor and the crystal structure of the cathode material are the same, the orientation of the hydroxide precursor is transferred as it is to the orientation of the cathode material. Therefore, it can be considered that the orientation of the cathode material reflects the orientation of the hydroxide precursor.

When analyzing EBSD below 30 degrees of orientation difference (Δg), the orientation of the cathode active material in the [120]+[210] direction based on the ND axis may be 70% or less, for example, 70 to 60%, 68 to 60% or 63 to 68%. When analyzing EBSD, the high orientation in the direction of the ND axis [120]+[210] means that the lithium migration path is not well formed in the outer direction. In this case, when the [120]+[210] orientation based on the ND axis has an orientation that exceeds 70%, the movement of lithium ions becomes difficult and high resistance may obtained. When the [120]+[210] orientation based on the ND axis is 70% or less, the resistance to lithium migration is lowered, and it is very advantageous in that the effect of improving capacity and output can be realized when implementing a battery.

When analyzing EBSD below 30 degrees of orientation difference (Δg), the orientation of the cathode active material in the [001] direction based on the RD axis may be 15% or less, for example, 15 to 10% or 15 to 12%. When analyzing EBSD, the high orientation in the direction of the RD axis [001] means that the lithium migration path is not well formed in the outer direction. Since the orientation of the precursor is transferred as it is to the cathode material, it means that the orientation is not formed in the outer direction even in the precursor. When the orientation with respect to the RD axis [001] plane is low, the movement of lithium ions becomes relatively easy, so it is very advantageous in that the effect of improving resistance, output and capacity can be improved when implementing a battery.

When analyzing EBSD below 30 degrees of orientation difference (Δg), the orientation of the cathode active material in the [001] direction based on the ND axis may be 30% or more, for example, 30% to 40% or 32 to 37%. In the EBSD analysis, the high orientation with respect to the ND axis [001] plane means the degree to which the lithium movement path is well formed in the outer direction. When the orientation falls within the above range, the effect of moving lithium ions may be improved, and thus a secondary battery having improved electrochemical properties may be obtained.

Another exemplary embodiment of the present invention provides a method for manufacturing a cathode active material for a lithium secondary battery. The manufacturing method may comprise obtaining a precursor by co-precipitation reaction metal, and obtaining a cathode active material for a lithium secondary battery by mixing and calcining the precursor and the lithium raw material, wherein the co-precipitation reaction induces a co-precipitation reaction by stirring an aqueous metal salt solution including a nickel salt, a manganese salt, and a cobalt salt, ammonia, and caustic soda in a reactor, and in the co-precipitation reaction, the temperature in the reactor is 25 to 35° C.

In the co-precipitation reaction, the temperature in the reactor may be 25 to 35° C., for example 25 to 30° C. When the temperature in the reactor falls within the above range, secondary particles of small particle size having a particle size range and sphericity coefficient required in the present invention may be obtained, thereby obtaining a lithium secondary battery with improved electrochemical performance. That is, It is characterized in that agglomeration hardly occurs by lowering the reaction temperature of 45° C., which is a commonly used cathode precursor manufacturing temperature, or more to 35° C. or less, more specifically 25° C. to 30° C.

In addition, by increasing the ionic strength in the reactor when the particles are generated, seed particles close to a spherical shape are generated. In other words, the present idea is characterized by producing a spherical small particle size precursor having a high tap density, and by increasing the ionic strength in the reactor, spherical seed particles are generated inside, and the temperature is reduced to suppress agglomeration of particles and promote crystal growth.

The reactor may be a continuous reactor (CSTR), a Quet Taylor reactor, or a batch reactor (Batch).

In the co-precipitation reaction, the stirring speed of the aqueous metal salt solution, ammonia, and caustic soda in the reactor may be 2 to 11 ms/sec at a linear speed, for example, 2 to 9 ms/sec, 2 to 7 ms/sec, or 2 to 5 ms/sec, and the rotational speed may be 50 to 200 rpm, for example, 50 to 150 rpm, 50 to 130 rpm, or 50 to 110 rpm. When the stirring speed falls within the above range, it is possible to suppress a phenomenon in which the surface of the cathode precursor is worn due to friction, and the performance of a lithium secondary battery employing the same may be improved.

In the co-precipitation reaction, the residence time in the reactor of the aqueous metal salt solution may be 10 hours or less, for example, 8 hours or less, 6 hours or less, 30 minutes to 4 hours, 30 minutes to 3 hours, 30 minutes to 2 hours, or 30. When the residence time of the reactor falls within the above range, secondary particles having a desired particle size range may be well manufactured by inhibiting the growth of precursor particles. On the other hand, when the residence time is excessively increased, particle growth may proceed and it may be difficult to prepare a small particle size precursor.

In the co-precipitation reaction, a ratio of the total number of moles of metal ions in the aqueous metal salt solution and the number of moles of ammonia to be quantitatively injected may be 1:0.5 to 1:1.5, for example, 1:1 to 1:1.5.

In the co-precipitation reaction, the pH in the reactor may be adjusted in the range of 10.5 to 12.0, for example, 11.0 to 12.0 or 11.2 to 11.7.

Obtaining a precursor by co-precipitation reaction metal may comprise mixing the precursor and the lithium source so that the molar ratio of Li/(Ni+Mn+Co) is 1.0 to 1.1, and heat treatment to prepare the cathode active material.

The lithium source may be at least one selected from lithium hydroxide, lithium carbonate, lithium sulfate, and lithium nitrate.

Another exemplary embodiment provides a lithium secondary battery comprising a cathode comprising the cathode active material, anode, and an electrolyte.

The cathode may be formed on a current collector and the current collector, and comprises a cathode active layer comprising the cathode active material.

In the cathode active material layer, the amount of cathode active material may be 90 wt % to 98 wt % based on the total weight of the cathode active material layer. In addition, the cathode active material layer may further comprise a binder and a conductive material. The content of the binder and the conductive material may be 1 wt % to 5 wt %, respectively, based on the total weight of the cathode active material layer.

As the binder, polyvinyl alcohol, carboxymethylcellulose, hydroxypropylcellulose, diacetylcellulose, polyvinyl chloride, polyvinylfluoride, polyvinylpyrrolidone, polyurethane, polytetrafluoroethylene, polyvinylidene fluoride, Polyethylene, polypropylene, styrene-butadiene rubber, acrylated styrene butadiene rubber, epoxy resin, nylon and other things may be used, but the present invention is not limited thereto.

As the conductive material, carbon-based materials such as natural graphite, artificial graphite, carbon black, acetylene black, ketjen black, carbon fiber, and other things, and metal-based materials such as metal powder, metal fibers such as copper, nickel, aluminum, and silver, and other things, and conductive polymers such as polyphenylene derivatives and other things, or a conductive material containing a mixture thereof may be used.

As the current collector, an aluminum foil, a nickel foil, or a combination thereof may be used, but the present invention is not limited thereto.

The anode includes a current collector and a anode active material layer including a anode active material formed on the current collector.

The anode active material comprises a material capable of reversibly intercalating/deintercalating lithium ions, a lithium metal, an alloy of a lithium metal, a material capable of doping and undoping on lithium, or a transition metal oxide.

As the material capable of reversibly intercalating/deintercalating lithium ions, any carbon-based anode active material generally used in lithium ion secondary batteries as a carbon material may be used, and representative examples thereof are crystalline carbon, amorphous carbon, or a combination thereof. Examples of the crystalline carbon comprise graphite such as amorphous, plate-shaped, flake, spherical or fibrous natural graphite or artificial graphite, and examples of the amorphous carbon comprise soft carbon or hard carbon, mesophase pitch carbide, and fired coke and other things.

The lithium metal alloy may comprise the metal alloy of lithium and a metal selected from Na, K, Rb, Cs, Fr, Be, Mg, Ca, Sr, Si, Sb, Pb, In, Zn, Ba, Ra, Ge, Al, and Sn.

As the material capable of doping and undoping on lithium, Si, SiOx (0<x<2), Si-Q alloy (wherein Q is an element selected from an alkali metal, an alkaline earth metal, a group 13 element, a group 14 element, a group 15 element, a group 16 element, a transition metal, a rare earth element, and combinations thereof, and Si is excluded.), Sn, SnO2, Sn—R alloy (wherein R is an element selected from an alkali metal, an alkaline earth metal, a group 13 element, a group 14 element, a group 15 element, a group 16 element, a transition metal, a rare earth element, and combinations thereof, and Sn is excluded.) and other things may be used, and at least one of these and SiO2 may be mixed and used. The elements Q and R comprise Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

As transition metal oxide, vanadium oxide, lithium vanadium oxide, or lithium titanium oxide may be used.

The content of the active material in the anode active material layer may be 95 to 99 wt % based on the total weight of the anode active material layer.

In an exemplary embodiment of the present invention, the anode active material layer comprises a binder, and may optionally further comprises a conductive material. The content of the binder in the anode active material layer may be 1 to 5 wt % based on the total weight of the anode active material layer. In addition, when a conductive material is further comprised, 90 to 98 wt % of the anode active material, 1 to 5 wt % of the binder, and 1 to 5 wt % of the conductive material may be used.

The binder may serve to attach the anode active material particles well to each other, and also serve to attach the anode active material to the current collector well. As the binder, a water-insoluble binder, a water-soluble binder, or a combination thereof may be used.

As the water-insoluble binder, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, polyamideimide, polyimide, or combinations thereof may be used.

As water-soluble binder, styrene-butadiene rubber, acrylated styrene-butadiene rubber (SBR), acrylonitrile-butadiene rubber, acrylic rubber, butyl rubber, fluorine rubber, ethylene propylene copolymer, polyepic chlorohydrin, polyphosphazene, polyacrylonitrile, polystyrene, ethylene propylene diene copolymer, polyvinylpyridine, chlorosulfonated polyethylene, latex, polyester resin, acrylic resin, phenol resin, epoxy resin, polyvinyl alcohol, or a combination thereof may be used.

When a water-soluble binder is used as the anode binder, a cellulose-based compound as thickener capable of imparting viscosity may be further comprised. As the cellulose-based compound, carboxymethyl cellulose, hydroxypropylmethyl cellulose, methyl cellulose, or an alkali metal salts combination thereof may be mixed and used. As the alkali metal, Na, K or Li may be used The content of the thickener may be 0.1 parts by weight to 3 parts by weight based on 100 parts by weight of the anode active material.

As the conductive material, carbon-based materials such as natural graphite, artificial graphite, carbon black, acetylene black, ketjen black, carbon fiber, and other things, and metal-based materials such as metal powder, metal fibers such as copper, nickel, aluminum, and silver, and other things, and conductive polymers such as polyphenylene derivatives and other things, or a conductive material containing a mixture thereof may be used.

As the current collector, a copper foil, a nickel foil, a stainless steel foil, a titanium foil, nickel foam, copper foam, a polymer substrate coated with a conductive metal, and a combination thereof may be used.

The electrolyte comprises a non-aqueous organic solvent and a lithium salt.

The non-aqueous organic solvent serves as a medium through which ions involved in the electrochemical reaction of a battery can move.

As the non-aqueous organic solvent, dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate. (EC), propylene carbonate (PC), butylene carbonate (BC), methyl acetate, ethyl acetate, n-propyl acetate, dimethyl acetate, methyl propionate, ethyl propionate, decanolide, mevalo Mevalonolactone, caprolactone, dibutyl ether, tetraglyme, diglyme, dimethoxyethane, 2-methyltetrahydrofuran, tetrahydrofuran, cyclohexanone, ethyl alcohol, isopropyl alcohol, R Nitriles such as —CN (R is a linear, branched, or cyclic hydrocarbon group having 2 to 20 carbon atoms, and may contain a double bonded aromatic ring or an ether bond.), and amides such as dimethylformamide, dioxolane such as 1,3-dioxolane, sulfolane, and other things may be used.

The organic solvent may be used alone or as a mixture of one or more, and the mixing ratio in the case of using one or more mixtures may be appropriately adjusted according to the desired battery performance, which may be widely understood by those working in the field.

In addition, the organic solvent may further comprise an aromatic hydrocarbon-based organic solvent. Specific examples of the aromatic hydrocarbon-based organic solvent may be selected from benzene, fluorobenzene, 1,2-difluorobenzene, 1,3-difluorobenzene, 1,4-difluorobenzene, 1,2,3-tri Fluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diaiodobenzene, 1,3-diaiodobenzene, 1,4-diaiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluoro Toluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diaiodotoluene, 2,4-diaiodotoluene, 2,5-diaiodotoluene, 2,3,4-triiodotoluene, 2,3,5-triiodotoluene, xylene, and a combination thereof.

The electrolyte may further comprise vinylene carbonate or an ethylene carbonate-based compound as a life-improving additive.

As representative examples of the ethylene carbonate-based compound, difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate and other things may be used. When further use of such a life-improving additive is used, the amount of the additive may be appropriately adjusted.

The lithium salt is a material that is dissolved in an organic solvent and acts as a source of lithium ions in the battery, enabling the operation of a basic lithium secondary battery, and promoting the movement of lithium ions between the cathode and the anode. Representative examples of such lithium salt comprise one or two or more supporting electrolytic salt that is selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers, for example, integers from 1 to 20), LiCl, LiI, and $LiB(C_2O_4)_2$ (lithium bis(oxalato) borate, LiBOB). It is recommended to use the lithium salt concentration within the range of 0.1 to 2.0 M. When the concentration of the lithium salt falls within the above range, since the electrolyte has an appropriate conductivity and viscosity, excellent electrolyte performance may be exhibited, and lithium ions may move effectively.

Depending on the type of lithium secondary battery, a separator may exist between the cathode and the anode.

As such a separator, polyethylene, polypropylene, polyvinylidene fluoride, or a multilayer film of two or more layers thereof may be used.

It goes without saying that a mixed multilayer film such as a polyethylene/polypropylene two-layer separator, a polyethylene/polypropylene/polyethylene three-layer separator, a polypropylene/polyethylene/polypropylene three-layer separator, and other things may be used.

Exemplary Embodiments and Comparative Examples are described below. Such following exemplary embodiments are only examples, and the present invention is not limited to the following exemplary embodiments.

EXAMPLES

Example 1

A cathode precursor is manufactured by applying a 1 liter class Couette-Taylor continuous reactor. As the initial conditions in the reactor, a solution in which 25 wt % caustic soda and 28 wt % ammonia were mixed at an 85:15 weight ratio was added, and the pH was set to 11.5. In order to inject the reaction product, a 2.5 M metal sulfate solution in which nickel sulfate, cobalt sulfate, and manganese sulfate were mixed at a molar ratio of 83:12:5 was continuously added. The reactor was operated by maintaining the internal temperature constant at 25° C. 28 wt % ammonia was quantitatively injected at a ratio of ammonia molar flow rate (mol/min) of 1:1 to the molar flow rate (mol/min) of the metal sulfate solution, and a co-precipitation operation was performed while maintaining a pH of 11.5 using 25 wt % NaOH. A co-precipitation precursor was prepared by setting the operating conditions of the Quette Taylor reactor to a linear speed of 3.0 m/sec and the residence time to 1 hour. Thereafter, ICP analysis was performed, and LiOH was mixed with the prepared precursor so that the molar ratio of Li/Metal (Ni+Mn+Co) was 1.03, and calcined at 780° C. for 15 hours to prepare a cathode active material.

Example 2

A precursor was prepared in the same manner as in Example 1, except that the temperature inside the reactor was maintained at 30° C., and a cathode active material was prepared.

Example 3

A precursor was prepared in the same manner as in Example 1, except that the temperature inside the reactor was maintained at 35° C., and a cathode active material was prepared.

Example 4

A precursor was prepared in the same manner as in Example 1 except for maintaining the temperature inside the reactor at 35° C. and changing the molar flow rate (mol/min) of ammonia relative to the molar flow rate (mol/min) of the metal sulfate solution at 1:0.9 (metal sulfate solution:ammonia), and a cathode active material was prepared.

Example 5

A precursor was prepared in the same manner as in Example 1 except for maintaining the temperature inside the reactor at 25° C. and changing the molar flow rate (mol/min) of ammonia relative to the molar flow rate (mol/min) of the metal sulfate solution at 1:0.75 (metal sulfate solution:ammonia), and a cathode active material was prepared.

Example 6

A precursor was prepared in the same manner as in Example 1 except for maintaining the temperature inside the reactor at 25° C. and changing the molar flow rate (mol/min) of ammonia relative to the molar flow rate (mol/min) of the metal sulfate solution at 1:0.5 (metal sulfate solution:ammonia), and a cathode active material was prepared.

Comparative Example 1

A precursor was prepared in the same manner as in Example 1, except that the temperature inside the reactor was maintained at 40° C., and a cathode active material was prepared.

Comparative Example 2

A precursor was prepared in the same manner as in Example 1, except that the temperature inside the reactor was maintained at 45° C., and a cathode active material was prepared.

Comparative Example 3

A precursor was prepared in the same manner as in Example 1, except that the temperature inside the reactor was maintained at 50° C., and a cathode active material was prepared.

Comparative Example 4

A precursor was prepared in the same manner as in Example 1, except that the temperature inside the reactor was maintained at 60° C., and a cathode active material was prepared.

Comparative Example 5

A precursor was prepared in the same manner as in Example 1, except that the temperature inside the reactor was maintained at 20° C., and a cathode active material was prepared.

Comparative Example 6

A precursor was prepared in the same manner as in Example 1 except for maintaining the temperature inside the reactor at 20° C. and changing the molar flow rate (mol/min) of ammonia relative to the molar flow rate (mol/min) of the metal sulfate solution at 1:2 (metal sulfate solution:ammonia), and a cathode active material was prepared.

Comparative Example 7

A precursor was prepared in the same manner as in Example 1 except for maintaining the temperature inside the reactor at 20° C. and changing the molar flow rate (mol/min) of ammonia relative to the molar flow rate (mol/min) of the metal sulfate solution at 1:0.9 (metal sulfate solution:ammonia), and a cathode active material was prepared.

Comparative Example 8

A precursor was prepared in the same manner as in Example 1 except for maintaining the temperature inside the reactor at 60° C. and changing the molar flow rate (mol/min) of ammonia relative to the molar flow rate (mol/min) of the metal sulfate solution at 1:0.5 (metal sulfate solution:ammonia), and a cathode active material was prepared.

Reference Example 1

A cathode active material was prepared in the same manner as in Example 1, except that the temperature inside the reactor was maintained at 20° C. and a general continuous stirring tank reactor (CSTR) was used.

EXPERIMENTAL EXAMPLE

Tap Density Measuring Method

The cathode precursor powders prepared in Example 1 to 3 and Comparative Examples 1 to 4 were tapped 3,000 times using a tap density meter, and then the tap density was measured.

Electrochemical Characteristic Evaluation Method

Electrochemical evaluation was performed using a CR2032 coin cell. The slurry for manufacturing the electrode plate was mixed with each of the cathode active materials prepared in Exemplary Embodiments and Comparative Examples: conductive material (carbon black, denka black): binder (PVDF, KF1100)=92.5:3.5:4 wt %, and NMP (N-Methyl-2-pyrrolidone) was added to adjust the viscosity so that the solid content was about 30%. The prepared slurry was coated on an Al foil having a thickness of 15 µm using a doctor blade, and then dried and rolled. The electrode loading amount was 14.6 mg/cm2, and the rolling density (25° C., 20 kN) was 3.1 g/cm3.

The electrolyte was 1M LiPF6 in EC:DMC:EMC=3:4:3 (vol %), and 3.0 vol % of VC was added to the total amount of the electrolyte, after the coin cell was manufactured using and a PP separator and a lithium anode electrode (200 µm, Honzo metal), aging was performed at room temperature for 10 hours, and a charge/discharge test was performed.

The charge/discharge current for capacity evaluation was calculated and set based on 205 mAh/g, and the charge/discharge conditions were CC/CV 2.5~4.25V, 1/20 C cut-off applied.

The initial charge/discharge capacity was performed with 0.2 C charge/0.2 C discharge at room temperature (25° C.).

Rate-characteristic was evaluated by the discharge capacity ratio by measuring the 2 C capacity compared to the 0.1 C capacity at room temperature, after measuring the discharge capacity by increasing the C-rate to 0.1 C/0.2 C/0.5 C/1 C/1.3 C/1.5 C/2 C.

High-temperature cycle life characteristics were measured 30 times under 0.3 C charge/0.3 C discharge conditions at high temperature (45° C.).

Orientation Evaluation Method

EBSD analysis was performed on the cathode active material powders prepared in Exemplary Embodiments 1 to 3 and Comparative Examples 1 to 4. The cathode active material powder was mixed with a polymer binder, mounted, and polished to process the surface. The manufactured sample was further processed to have a very smooth surface through ion milling again, and after confirming the surface of the prepared powder, an EBSD crystal orientation analysis was performed on a hemispherical cathode material (a cross-section cathode material having a circular shape). The direction of the ND axis was set based on the hemispherical cross-section. Accordingly, the RD axis was determined. For the analysis of crystal orientation, the orientation was set based on ±30 degrees during mapping obtained from EBSD. Crystal orientation analysis was performed using a hexagonal structure as a basic structure.

The aspect ratio was analyzed using EBSD equipment for the primary particles of the cathode active material. The closer the aspect ratio measurement value is to 0, the more the primary particle is in a rod shape.

As for the sphericity, a microscopic image was obtained for 300 cross-sectional particle powders generated after ion milling of a sample prepared for EBSD, and the ratio of the long axis length to the short axis length was measured using an image program and averaged to calculate the sphericity.

Evaluation Example 1: Evaluation of the Tap Density and Average Particle Sinze (D50) of the Cathode Precursor

TABLE 1

| | reaction temperature (° C.) | Average particle size of precursor D50 (μm) | Tap density of precursor (g/cm$^3$) |
|---|---|---|---|
| Example 1 | 25 | 5.1 | 2.074 |
| Example 2 | 30 | 3.9 | 1.701 |
| Example 3 | 35 | 4.8 | 2.134 |
| Comparative Example 1 | 40 | 7.0 | 2.035 |
| Comparative Example 2 | 45 | 7.1 | 2.032 |
| Comparative Example 3 | 50 | 7.3 | 2.13 |
| Comparative Example 4 | 60 | 8.1 | 2.016 |
| Comparative Example 5 | 20 | 1.3 | 1.203 |

Referring to Table 1, in the case of the cathode precursor powder prepared in Exemplary Embodiments 1 to 3, the tap density was maintained at a level equal to or higher than that of Comparative Examples 1 to 4, and It was confirmed to have an average particle size (D50) of a small size of 3.9 to 5.1 μm. That is, in the co-precipitation reaction, when the reaction temperature of the reactor is maintained at 25 to 3500, a small particle size precursor material may be effectively prepared. However, as shown in Comparative Example 5, when the reaction temperature is maintained at 20° C., the particle size becomes 1.3 μm, and the value as a small particle size precursor is lost, and the tap density is also significantly reduced. That is, small particle size precursors are not well produced.

Evaluation Expression 2: Evaluation of Electrochemical Characteristics

TABLE 2

| | Reaction temperature (° C.) | Charge capacity (mAh/g) | Discharge capacity (mAh/g) | Initial efficiency (%) | Rate-characteristic (2 C/0.1 C) (%) | Capacity retention rate (0.3 C, 45° C.) (%) |
|---|---|---|---|---|---|---|
| Example 1 | 25 | 215.9 | 198.7 | 92.0 | 83.4 | 97.1 |
| Example 2 | 30 | 216.6 | 199.4 | 92.1 | 83.7 | 97.0 |
| Example 3 | 35 | 216.1 | 198.9 | 92.0 | 83.2 | 96.8 |
| Comparative Example 1 | 40 | 215.9 | 193.4 | 89.6 | 82.3 | 94.8 |
| Comparative Example 3 | 50 | 215.8 | 191.4 | 85.4 | 82.1 | 93.9 |
| Comparative Example 5 | 20 | 211.3 | 173.6 | 82.2 | 73.4 | 88.1 |

Referring to Table 2, in the coin cells using the cathode active material-prepared in Exemplary Embodiments 1 to 3, the charge/discharge capacity was improved, the initial efficiency was 92% or more, the high temperature capacity retention rate was 96.8% or more, and the rate-characteristic was improved to 83.2 to 83.4%, which was improved by 1% or more compared to Comparative Examples 1 and 3. On the other hand, in the case of Comparative Example 5 in which the co-precipitation was performed at 20° C., it can be seen that all electrochemical characteristics such as capacity and initial efficiency, rate-characteristic, capacity retention rate, and the like are significantly reduced because the small particle size cathode material was not properly formed.

Evaluation Example 3: Evaluation of the Aspect Ratio of the Primary Particles of the Cathode Active Material, the Change of the a Value, and the Change of Impedance Resistance During XRD Measurement of the Cathode

TABLE 3

|  | reaction temperature (° C.) | Aspect ratio of the primary particles | 'a' value during XRD measurement | Impedance resistance (ohm) |
|---|---|---|---|---|
| Example 1 | 25 | 0.35 | 2.8745 | 3.7 |
| Example 2 | 30 | 0.39 | 2.8744 | 3.8 |
| Example 3 | 35 | 0.41 | 2.8743 | 3.8 |
| Example 4 | 35 | 0.45 | 2.8735 | 3.8 |
| Example 5 | 25 | 0.21 | 2.8750 | 3.1 |
| Example 6 | 25 | 0.25 | 2.8747 | 3.4 |
| Comparative Example 1 | 40 | 0.47 | 2.8729 | 4.2 |
| Comparative Example 2 | 45 | 0.49 | 2.8732 | 4.3 |
| Comparative Example 3 | 50 | 0.51 | 2.8731 | 4.3 |
| Comparative Example 4 | 60 | 0.50 | 2.8730 | 4.3 |
| Comparative Example 5 | 20 | 0.50 | 2.8729 | 6.7 |
| Comparative Example 6 | 20 | 0.19 | 2.8728 | 6.9 |

TABLE 3-continued

|  | reaction temperature (° C.) | Aspect ratio of the primary particles | 'a' value during XRD measurement | Impedance resistance (ohm) |
|---|---|---|---|---|
| Comparative Example 7 | 20 | 0.51 | 2.8704 | 7.3 |
| Comparative Example 8 | 60 | 0.53 | 2.8751 | 7.6 |

Referring to Table 3, in the cathode active materials prepared in Exemplary Embodiments 1 to 6, since the aspect ratio of the primary particles located on the surface of the secondary particles is 0.21 to 0.45, and then the primary particles of the cathode active material are rods shape. In addition, the cathode active materials prepared in Exemplary Embodiments 1 to 6 had the a value obtained by XRD measurement of 2.8735 to 2.8750, and It was found that the crystallinity of the secondary particles of the cathode active material was improved compared to the cathode active materials manufactured in Comparative Examples 1 to 4.

Meanwhile, it was confirmed that the impedance resistance of the cathode active materials prepared in Exemplary Embodiments 1 to 6 was reduced by about 10% compared to Comparative Examples 1 to 4.

When the co-precipitation operation was performed at 20° C. as in Comparative Example 5, the aspect ratio of the primary particles was higher as 0.5, compared to the cathode active materials prepared in Exemplary Embodiments 1 to 6, and the a value was 2.8729 in XRD measurement, lower than the Exemplary Embodiments, and in the case of resistance, and it can be seen that it increased very significantly to 6.7 ohm.

In the case of Comparative Example 6, for example, when the aspect ratio of the particles is lowered by adding an excessive amount of ammonia, when the aspect ratio becomes 0.19, the value of a is rather reduced during XRD measurement and the impedance resistance increases, so it may be understood that a critical value for the aspect ratio of the primary particles exist.

In the case of Comparative Examples 7 and 8, when the a value is 2.8751, which is larger than that of the embodiment, or 2.8704, which is smaller than that of the embodiment during XRD measurement, the impedance resistance is rather increased.

Evaluation Example 4: Evaluation of Orientation of the Cathode Active Material by EBSD (Electron Backscatter Diffraction) Analysis

TABLE 4

|  | Manipulation variable | EBSD analysis result at less than 30° C. of orientation difference (Δg) | | | | Sphericity cross-section | Density (g/cm³) | |
|---|---|---|---|---|---|---|---|---|
|  |  | [001] direction based | [210] direction based | [120] direction based | [120] + [210] direction based | long axis length/short length | | |
|  | reaction temperature | on the ND axis | on the ND axis | on the ND axis | on the ND axis | (l/w) | Tap density | Rolling density |
| Example 1 | 25 | 32 | 33 | 35 | 68 | 1.23 | 1.8 | 2.6 |
| Example 2 | 30 | 37 | 30 | 33 | 63 | 1.17 | 2.3 | 3.4 |
| Example 3 | 35 | 34 | 32 | 35 | 67 | 1.09 | 2.4 | 3.4 |
| Example 4 | 35 | 30 | 33 | 37 | 70 | 1.09 | 2.4 | 3.4 |
| Comparative Example 1 | 40 | 29 | 35 | 36 | 71 | 1.36 | 2.6 | 3.5 |
| Comparative Example 2 | 45 | 24 | 37 | 39 | 76 | 1.33 | 2.6 | 3.5 |

TABLE 4-continued

| | Manipulation variable reaction temperature | EBSD analysis result at less than 30° C. of orientation difference (Δg) | | | | Sphericity cross-section long axis length/ short length (l/w) | Density (g/cm³) | |
| --- | --- | --- | --- | --- | --- | --- | --- | --- |
| | | [001] direction based on the ND axis | [210] direction based on the ND axis | [120] direction based on the ND axis | [120] + [210] direction based on the ND axis | | Tap density | Rolling density |
| Comparative Example 3 | 50 | 19 | 37 | 44 | 81 | 1.41 | 2.6 | 3.4 |
| Comparative Example 4 | 60 | 15 | 40 | 45 | 85 | 1.67 | 2.5 | 3.2 |
| Comparative Example 5 | 20 | 18 | 38 | 45 | 82 | 2.31 | 1.20 | 1.9 |
| 참고예1 | 20 | 41 | 31 | 28 | 59 | 2.43 | 1.18 | 1.7 |

TABLE 5

| | Manipulation variable Reaction temperature | EBSD analysis result at less than 30° C. of orientation difference (Δg) | | | | Sphericity cross-section long axis length/ short length (l/w) | Density (g/cm³) | |
| --- | --- | --- | --- | --- | --- | --- | --- | --- |
| | | [001] direction based on the RD axis | [210] direction based on the ND axis | [120] direction based on the ND axis | [120] + [210] direction based on the ND axis | | Tap density | Rolling density |
| exemplary embodiment1 | 25 | 15 | 32 | 53 | 85 | 1.23 | 1.8 | 2.6 |
| exemplary embodiment2 | 30 | 12 | 36 | 52 | 88 | 1.17 | 2.3 | 3.4 |
| exemplary embodiment3 | 35 | 14 | 35 | 50 | 85 | 1.09 | 2.4 | 3.4 |
| exemplary embodiment4 | 35 | 13 | 36 | 51 | 87 | 1.09 | 2.4 | 3.4 |
| Comparative Example1 | 40 | 18 | 31 | 51 | 82 | 1.36 | 2.6 | 3.5 |
| Comparative Example2 | 45 | 18 | 32 | 50 | 82 | 1.33 | 2.6 | 3.5 |
| Comparative Example3 | 50 | 29 | 28 | 43 | 71 | 1.41 | 2.6 | 3.4 |
| Comparative Example4 | 60 | 38 | 27 | 35 | 62 | 1.67 | 2.5 | 3.2 |
| Comparative Example5 | 20 | 27 | 32 | 41 | 73 | 2.31 | 1.20 | 1.9 |
| 참고예1 | 20 | 9 | 37 | 54 | 91 | 2.43 | 1.18 | 1.7 |

Referring to Table 4, the cathode active material powder prepared in Exemplary Embodiments 1 to 3 showed a significant decrease in the direction of [120]+[210] based on the ND axis as a result of EBSD analysis compared to the powder prepared in Comparative Examples 1 to 4. Through this, it may be confirmed that the movement path of the lithium ions in the outer direction has been improved. Referring to Table 5, the cathode active material powder prepared in Exemplary Embodiments 1 to 3 significantly increased in the direction of [120]+[210] based on the RD axis as a result of EBSD analysis compared to the powder prepared in Comparative Examples 1 to 4. Through this, it may be confirmed that the movement path of the lithium ions in the outer direction has been improved.

In the case of Comparative Example 5, the physical properties were measured when the precursor was prepared at a lower temperature than the Exemplary Embodiments. In the experimental conditions of Comparative Example 5, it may be understood that the orientation is significantly worse than in Examples 1 to 6, and it may be seen that all precursor properties such as sphericity, tap density, and pellet density are significantly deteriorated. It is believed that this is because the precursor formation itself becomes very difficult under the temperature conditions of Comparative Example 5.

In the case of Reference Example 1, it is the result of measuring the physical properties of the precursor manufactured by controlling the orientation of the precursor by administering an excessive amount of ammonia.

As shown in Table 4, it may be understood that when the [120]+[210] direction is manufactured lower than that of the Exemplary Embodiments, the tap density and the rolling density are significantly lowered and the sphericity is greatly deteriorated. In addition, as shown in Table 5, even when the orientation in the [120]+[210] direction based on the RD axis is extremely increased, the tap density and the rolling density are lowered, and the sphericity is significantly deteriorated.

Referring to Table 4 or 5, it may be seen that the sphericity of the cathode active materials prepared in Exemplary Embodiments 1 to 3 was 1.09 to 1.23, and that the sphericity was improved compared to the cathode active materials prepared in Comparative Examples 1 to 4.

Evaluation Example 5: Only [the Total Number of Moles of Metal Ions in Aqueous Metal Salt Solution: The Number of Moles of Ammonia] Variable was Manipulated, the Remaining Variables were Controlled within the Range of the Comparative Examples As shown in Table 6-9 below, only one variable was given, and the other variables were controlled. The results are shown in Table 6 below.

As may be seen from Table 6-9, it may be seen that the physical properties of the cathode material are excellent when the total number of moles of metal ions in the aqueous metal salt solution: the number of moles of ammonia is in the range of 1:0.95 to 1:1.5. More preferably, it may be seen that the range of 1:1.1 to 1:1.2 is excellent

TABLE 6

| No. | Manipulation variable metal ion:암모니아 몰비 | EBSD analysis result at less than 30° C. of orientation difference (Δg) | | | | Sphericity l/w (cross-section long axis diameter/ short axis diameter) | Density (g/cm³) | |
| | | [001] direction based on the ND axis | [210] direction based on the ND axis | [120] direction based on the ND axis | [120] + [210] direction based on the ND axis | | 25° C. Tap density | 25° C., 20 kN Rolling density |
|---|---|---|---|---|---|---|---|---|
| A01 | 1:0.65 | 15 | 40 | 45 | 85 | 1.81 | 1.3 | 1.8 |
| A02 | 1:0.75 | 18 | 41 | 41 | 82 | 1.72 | 1.6 | 2.2 |
| A03 | 1:0.85 | 19 | 37 | 44 | 81 | 1.51 | 1.8 | 2.5 |
| A04 | 1:0.95 | 22 | 37 | 41 | 78 | 1.46 | 2.2 | 3.0 |
| A05 | 1:1.00 | 24 | 37 | 39 | 76 | 1.23 | 2.3 | 3.1 |
| A06 | 1:1.10 | 29 | 35 | 36 | 71 | 1.13 | 2.5 | 3.4 |
| A07 | 1:1.15 | 32 | 34 | 34 | 68 | 1.13 | 2.6 | 3.5 |
| A08 | 1:1.20 | 34 | 31 | 35 | 66 | 1.02 | 2.5 | 3.4 |
| A09 | 1:1.25 | 34 | 32 | 35 | 67 | 1.02 | 2.1 | 2.9 |
| A10 | 1:1.35 | 34 | 33 | 34 | 67 | 1.03 | 2.0 | 2.7 |
| A11 | 1:1.45 | 33 | 32 | 35 | 67 | 1.04 | 1.8 | 2.5 |
| A12 | 1:1.5 | 34 | 31 | 36 | 67 | 1.03 | 1.7 | 2.3 |
| A13 | 1:1.55 | 33 | 33 | 34 | 67 | 1.06 | 1.6 | 2.3 |
| A14 | 1:1.65 | 32 | 33 | 35 | 68 | 1.09 | 1.6 | 2.3 |
| A15 | 1:1.75 | 30 | 34 | 36 | 70 | 1.0 | 1.6 | 2.2 |

TABLE 7

| No. | Manipulation variable Metal ion:Ammonia molar ratio | EBSD analysis result at less than 30° C. of orientation difference (Δg) | | | | Sphericity l/w | Density (g/cm³) | |
| | | [001] direction based on the RD axis | [210] direction based on the RD axis | [120] direction based on the RD axis | [120] + [210] direction based on the RD axis | | 25° C. Tap density | 25° C., 20 kN Rolling density |
|---|---|---|---|---|---|---|---|---|
| A01 | 1:0.65 | 63 | 20 | 18 | 38 | 1.81 | 1.3 | 1.8 |
| A02 | 1:0.75 | 49 | 24 | 27 | 51 | 1.72 | 1.6 | 2.2 |
| A03 | 1:0.85 | 38 | 27 | 35 | 62 | 1.51 | 1.8 | 2.5 |
| A04 | 1:0.95 | 29 | 28 | 43 | 71 | 1.46 | 2.2 | 3.0 |
| A05 | 1:1.00 | 25 | 29 | 46 | 75 | 1.23 | 2.3 | 3.1 |
| A06 | 1:1.10 | 18 | 32 | 50 | 82 | 1.13 | 2.5 | 3.4 |
| A07 | 1:1.15 | 15 | 33 | 52 | 85 | 1.13 | 2.6 | 3.5 |
| A08 | 1:1.20 | 13 | 35 | 52 | 87 | 1.02 | 2.5 | 3.4 |
| A09 | 1:1.25 | 14 | 34 | 52 | 86 | 1.02 | 2.1 | 2.9 |
| A10 | 1:1.35 | 15 | 35 | 50 | 85 | 1.03 | 2.0 | 2.7 |
| A11 | 1:1.45 | 14 | 37 | 49 | 86 | 1.04 | 1.8 | 2.5 |
| A12 | 1:1.5 | 14 | 38 | 47 | 86 | 1.03 | 1.7 | 2.3 |

TABLE 7-continued

| | | EBSD analysis result at less than 30° C. of orientation difference (Δg) | | | | | Density (g/cm³) | |
|---|---|---|---|---|---|---|---|---|
| No. | Manipulation variable Metal ion:Ammonia molar ratio | [001] direction based on the RD axis | [210] direction based on the RD axis | [120] direction based on the RD axis | [120] + [210] direction based on the RD axis | Sphericity l/w | 25° C. Tap density | 25° C., 20 kN Rolling density |
| A13 | 1:1.55 | 14 | 34 | 54 | 86 | 1.06 | 1.6 | 2.3 |
| A14 | 1:1.65 | 13 | 33 | 54 | 87 | 1.09 | 1.6 | 2.3 |
| A15 | 1:1.75 | 15 | 32 | 53 | 85 | 1.03 | 1.6 | 2.2 |

TABLE 8

| No. | Manipulation variable Metal ion:Ammonia molar ratio | D10 | D25 | D50 | D75 | D90 |
|---|---|---|---|---|---|---|
| A01 | 1:0.65 | 8.9 | 10.0 | 11.7 | 13.8 | 16.3 |
| A02 | 1:0.75 | 8.4 | 9.4 | 11.0 | 13.0 | 15.3 |
| A03 | 1:0.85 | 7.7 | 8.7 | 10.2 | 12.0 | 14.1 |
| A04 | 1:0.95 | 12.6 | 14.1 | 16.5 | 19.5 | 23.0 |
| A05 | 1:1.00 | 12.5 | 14.1 | 16.4 | 19.4 | 22.9 |
| A06 | 1:1.10 | 12.8 | 14.4 | 16.8 | 19.8 | 23.3 |
| A07 | 1:1.15 | 12.7 | 14.3 | 16.7 | 19.7 | 23.2 |
| A08 | 1:1.20 | 12.9 | 14.5 | 17.0 | 20.0 | 23.6 |
| A09 | 1:1.25 | 12.7 | 14.2 | 16.6 | 19.6 | 23.1 |
| A10 | 1:1.35 | 12.4 | 13.9 | 16.3 | 19.2 | 22.6 |
| A11 | 1:1.45 | 12.1 | 13.6 | 16.1 | 8.8 | 22.2 |
| A12 | 1:1.5 | 11.9 | 13.3 | 16.0 | 18.4 | 21.7 |
| A13 | 1:1.55 | 9.7 | 10.9 | 12.7 | 15.0 | 17.7 |
| A14 | 1:1.65 | 9.4 | 10.6 | 12.4 | 14.6 | 17.2 |
| A15 | 1:1.75 | 9.0 | 10.1 | 11.9 | 14.0 | 16.5 |

TABLE 9

| | 25 OR 30° C. characteristic | | | | | | 45° C. characteristic |
|---|---|---|---|---|---|---|---|
| No. | Initial discharge capacity @0.2 C | Initial efficiency | 30 cycle discharge capacity | 30 cycle efficiency | 100 cycle discharge capacity | 100 cycle efficiency | 100 cycle efficiency |
| A01 | 192.3 | 84.0 | 175.4 | 85 | 149.1 | 78 | 37 |
| A02 | 198.8 | 86.8 | 188.2 | 89 | 167.4 | 85 | 45 |
| A03 | 201.0 | 87.8 | 189.6 | 91 | 172.5 | 92 | 80 |
| A04 | 205.4 | 89.7 | 196.5 | 97 | 190.6 | 95 | 85 |
| A05 | 206.7 | 90.3 | 196.7 | 97 | 190.8 | 95 | 86 |
| A06 | 207.6 | 90.7 | 196.5 | 98 | 192.5 | 95 | 86 |
| A07 | 208.2 | 90.8 | 197.1 | 98 | 193.1 | 96 | 86 |
| A08 | 208.7 | 91.2 | 197.7 | 98 | 193.7 | 96 | 85 |
| A09 | 209.3 | 91.0 | 196.5 | 98 | 192.6 | 96 | 86 |
| A10 | 210.2 | 91.1 | 196.7 | 98 | 192.8 | 96 | 86 |
| A11 | 211.3 | 91.8 | 196.4 | 97 | 190.5 | 95 | 85 |
| A12 | 211.2 | 91.4 | 195.8 | 97 | 190.0 | 95 | 85 |
| A13 | 211.4 | 90.6 | 193.1 | 95 | 167.9 | 87 | 76 |
| A14 | 210.7 | 89.7 | 189.7 | 90 | 153.6 | 81 | 65 |
| A15 | 210.8 | 88.0 | 180.1 | 88 | 117.1 | 65 | 37 |

The present invention is not limited to the above Exemplary Embodiments but may be manufactured in a variety of different forms, It will be understood by those skilled in the art that various changes in form and details may be made therein without departing from the spirit and scope of the present invention as defined by the following claims. It is therefore to be understood that the above-described embodiments are illustrative in all aspects and not restrictive.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A cathode active material for a lithium secondary battery comprising
    secondary particles in which primary particles represented by Chemical Formula 1 below are aggregated,
    wherein the average particle size (D50) of the secondary particles is 2.5 μm or more and 7 μm or less,
    an average value of the sphericity coefficient, which is the ratio (l/w) of the long axis length (l) to the short axis length (w) of the secondary particles, is 1.0 to 1.25, and
    an aspect ratio of primary particles positioned on a surface of the secondary particles is 0.21 to 0.45:

$Li_aNi_xCo_yMn_{(1-x-y)}O_2$      [Chemical Formula 1]

in the Chemical Formula 1, 0.80≤a≤1.20, 0.33≤x≤0.90, 0≤y≤0.33, and 0<x+y<1.

2. The cathode active material for a lithium secondary battery of claim 1, wherein,
    the primary particles positioned on the surface of the secondary particles have a rod shape.

3. The cathode active material for a lithium secondary battery of claim 1, wherein,
    the average particle size (D50) of the secondary particles is 2.5 to 6 μm.

4. The cathode active material for a lithium secondary battery of claim 1, wherein,
    the secondary particles have a ratio of the D10 particle size to the D50 particle size (D10/D50) of 0.64 to 0.91.

5. The cathode active material for a lithium secondary battery of claim 1, wherein,
    the secondary particles have a ratio of the D10 particle size to the D25 particle size (D10/D25) of 1.07 to 0.75.

6. The cathode active material for a lithium secondary battery of claim 1, wherein,
    the secondary particles have a ratio of the D90 particle size to the D50 particle size (D90/D50) of 1.65 to 1.16.

7. The cathode active material for a lithium secondary battery of claim 1, wherein,
    the secondary particles have a ratio of the D90 particle size to the D75 particle size (D90/D75) of 1.41 to 0.98.

8. The cathode active material for a lithium secondary battery of claim 1, wherein,
    the secondary particles have a ratio of "D90–D10 particle size difference" to D50 particle size (D90–D10/D50) of 0.25 to 1.01.

9. The cathode active material for a lithium secondary battery of claim 1, wherein,
    which is originated from a precursor with a tap density of 1.7 to 2.2 g/cm³ at 25° C.

10. The cathode active material for a lithium secondary battery of claim 1, wherein,
    the density is 2.5 to 3.5 g/cm³ when rolling with a pressure of 20 kN at 5° C.

11. The cathode active material for a lithium secondary battery of claim 1, wherein,
    the a value is 2.8705 to 2.8750 in XRD measurement.

12. The cathode active material for a lithium secondary battery of claim 1, wherein,
    the impedance resistance is less than 5.0 ohm.

13. The cathode active material for a lithium secondary battery of claim 1, wherein,
    the orientation in the [120]+[210] direction based on the RD axis is 85% or more when analyzing EBSD (Electron backscatter diffraction) below 30 degrees of orientation difference (Δg).

14. The cathode active material for a lithium secondary battery of claim 1, wherein,
    when analyzing EBSD below 30 degrees of orientation difference (Δg), the orientation in the [120]+[210] direction based on the ND axis is 70% or more.

15. A method for manufacturing a cathode active material for a lithium secondary battery, comprising:
    obtaining a precursor by co-precipitation reaction of metal salts; and
    obtaining a cathode active material for a lithium secondary battery by mixing and calcining the precursor and a lithium raw material,
    wherein the co-precipitation reaction induces a co-precipitation reaction by stirring an aqueous metal salt solution including a nickel salt, a manganese salt, and a cobalt salt, ammonia, and caustic soda in a reactor,
    the temperature in the reactor is 25 to 35° C. in the co-precipitation reaction, and
    the pH in the reactor is maintained in the range of 10.5 to 11.7 during the entire co-precipitation reaction.

16. The method for manufacturing a cathode active material for a lithium secondary battery of claim 15, wherein,
    the stirring speed of the aqueous metal salt solution, ammonia, and caustic soda in the reactor is 2 m/sec to 11 ms/sec at a linear speed in the co-precipitation reaction.

17. The method for manufacturing a cathode active material for a lithium secondary battery of claim 15, wherein,
    the stirring speed of the aqueous metal salt solution, ammonia, and caustic soda in the reactor is 50 to 200 rpm at a rotational speed in the co-precipitation reaction, and
    the residence time in the reactor of the aqueous metal salt solution is 30 minutes to 4 hours in the co-precipitation reaction.

18. The method for manufacturing a cathode active material for a lithium secondary battery of claim 15, wherein,
    the ratio of the total number of moles of metal ions in the aqueous metal salt solution to be continuously injected and the number of moles of ammonia injected quantitaively [the total number of moles of metal ions in the aqueous solution of metal salt continuously injected: the number of moles of ammonia to be quantitatively injected] is 1:0.5 to 1:1.5 in the co-precipitation reaction.

* * * * *